United States Patent

Lionnet

[11] Patent Number: 4,514,031
[45] Date of Patent: Apr. 30, 1985

[54] RECOVERABLE ARTICLE

[75] Inventor: Richard Lionnet, Parmain, France

[73] Assignee: Raychem Pontoise, S. A., France

[21] Appl. No.: 387,371

[22] Filed: Jun. 11, 1982

[30] Foreign Application Priority Data

Jun. 23, 1981 [GB] United Kingdom ............... 8119347

[51] Int. Cl.³ .................... H01B 17/00; H01R 4/10; H01R 43/02
[52] U.S. Cl. .................................... 339/205; 339/30; 339/275 B; 339/DIG. 1
[58] Field of Search ............ 339/DIG. 1, 205, 275 B, 339/30

[56] References Cited

U.S. PATENT DOCUMENTS

| | | |
|---|---|---|
| 2,027,962 | 3/1933 | Currie . |
| 3,086,242 | 4/1963 | Cook et al. . |
| 3,396,460 | 8/1968 | Wetmore . |
| 3,525,799 | 8/1970 | Ellis .............................. 339/DIG. 1 |
| 3,662,094 | 5/1972 | Wetmore et al. ............ 339/DIG. 1 |
| 3,678,174 | 7/1972 | Ganzhorn . |
| 3,721,749 | 3/1973 | Clabburn . |
| 3,945,114 | 3/1976 | Siden et al. . |
| 3,957,372 | 5/1976 | Jowett et al. . |
| 4,077,692 | 3/1978 | Ellis et al. ..................... 339/DIG. 1 |
| 4,149,911 | 4/1979 | Clabburn . |
| 4,221,457 | 9/1980 | Allen et al. . |
| 4,233,731 | 11/1980 | Clabburn et al. . |
| 4,237,609 | 12/1980 | Clabburn et al. . |

FOREIGN PATENT DOCUMENTS

| | | |
|---|---|---|
| 1062043 | 3/1967 | United Kingdom . |
| 1440122 | 6/1976 | United Kingdom . |
| 1440524 | 6/1976 | United Kingdom . |
| 1572038 | 7/1980 | United Kingdom . |
| 2070469A | 9/1981 | United Kingdom . |
| 2082110A | 3/1982 | United Kingdom . |
| 2083403A | 3/1982 | United Kingdom . |
| 2083859A | 3/1982 | United Kingdom . |

OTHER PUBLICATIONS

U.S. Patent Application, Ser. No. 172,897, filed Jul. 28, 1980, for Mass Connector Device by Stephen Hunter Diaz.

Primary Examiner—Z. R. Bilinsky
Attorney, Agent, or Firm—Ira D. Blecker; James W. Peterson; Herbert G. Burkard

[57] ABSTRACT

A heat recoverable electrical connector has a tubular enclosure that is open at each end to receive respective elongate electrical conductors. The openings are such that the conductors are receivable in the connector by bringing them thereto in a translational movement from a direction perpendicular to their axes; the need for accurate alignment of the conductors with the connector is thus avoided. The connector is subsequently heated to effect its recovery and to connect and encapsulate the conductors. Electrical connection between the conductors is enhanced by a solder ring located within the connector enclosure.

12 Claims, 4 Drawing Figures

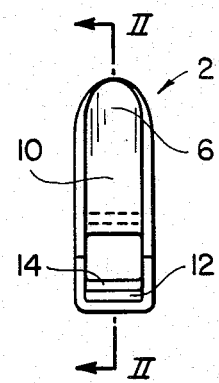 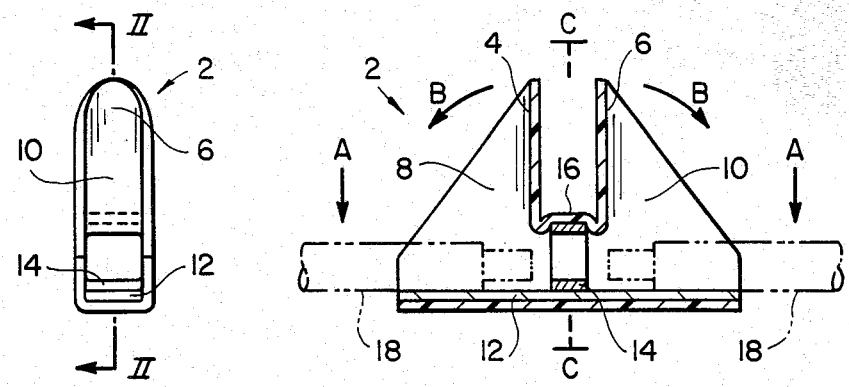
FIG_1   FIG_2
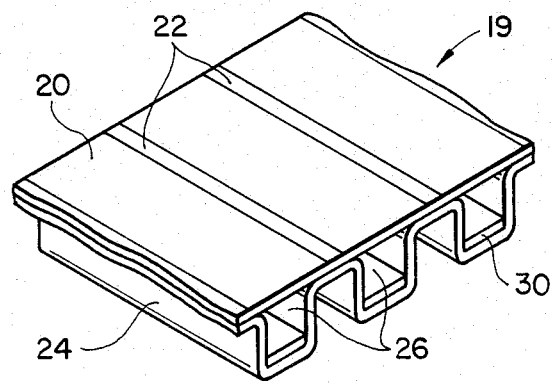
FIG_3
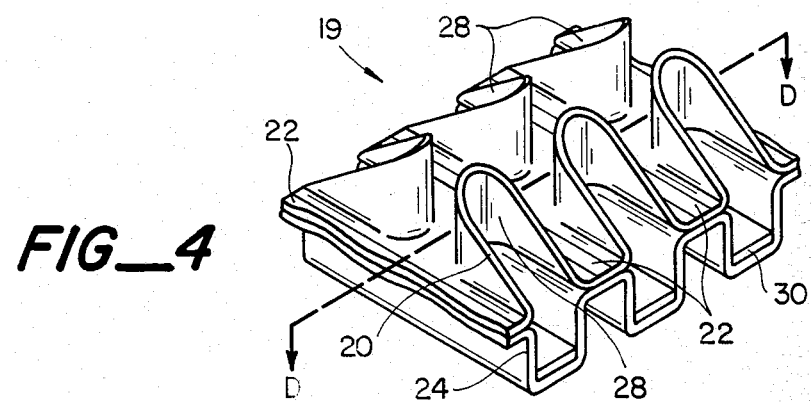
FIG_4

RECOVERABLE ARTICLE

DESCRIPTION

This invention relates to recoverable articles, and is particularly though not exclusively concerned with recoverable, preferably heat-recoverable, articles for connecting electrical conductors together.

A "recoverable" article is one whose dimensional configuration may be made to change when subjected to an appropriate treatment. Usually these articles recover towards an original shape from which they have previously been deformed but the term "recoverable", as used herein, also includes an article which adopts a new configuration, even if it has not been previously deformed. The article may be heat recoverable, such that its dimensional configuration may be made to change when subjected to heat treatment.

Examples of recoverable articles are given in U.S. Pat. Nos. 4,149,911, 4,221,457, 4,233,731 and 4,237,609.

In their most common form, such articles comprise a heat-shrinkable sleeve made from a polymeric material exhibiting the property of elastic or plastic memory as described, for example, in U.S. Pat. Nos. 2,027,962; 3,086,242 and 3,957,372, the disclosures of which are herein incorporated by this reference. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat stable article is deformed to a dimensionally heat unstable form in a separate stage.

In the production of heat recoverable articles, the polymeric material may be cross-linked at any stage in the production of the article that will enhance the desired dimensional recoverability. One manner of producing a heat-recoverable article comprises shaping the polymeric material into the desired heat-stable form, subsequently cross-linking the polymeric material, heating the article to a temperature above the crystalline melting point or, for amorphous materials the softening point, as the case may be, of the polymer, deforming the article and cooling the article whilst in the deformed state so that the deformed state of the article is retained. In use, since the deformed state of the article is heat-unstable, application of heat will cause the article to assume its original heat-stable shape.

In other articles, as described, for example, in British Pat. No. 1,440,524, an elastomeric member such as an outer tubular member is held in a stretched state by a second member, such as an inner tubular member, which upon heating weakens and thus allows the elastomeric member to recover.

Heat-recoverable electrical connectors are known, from UK Patent Specification No. 1,062,043 and pending UK Patent Application Publication No. 2,027,561A, for example, that comprise a heat-recoverable substantially cylindrical tube of polymeric material that is open at each end and a quantity of solder disposed therein. In use, two end stripped conductors to be joined together are introduced axially into respective ends of the connectors so as to be disposed adjacent the solder. The connector is then heated, the tube recovers, in this case by contracting towards a substantially smaller diameter configuration, thereby to enclose the conductors, and the solder melts and forms an electrical connection between them. Thus, mechanical encapsulation and electrical interconnection are conveniently provided by a single operation.

Such connectors have found wide application, not only for making discrete connections, but also for simultaneously terminating a plurality of conductors on to pins of a multi-pin connector, as disclosed in U.S. Pat. No. 3,945,114 and UK Patent Publication No. 2,070,469A. The arrangements disclosed in these specifications operate semi-automatically, in particular axial alignment between the conductors to be joined by the connector is effected automatically. However, there are applications in which the advantages of a connector as described above are desirable but in which it is not convenient or otherwise suitable to provide such automatic axial alignment.

U.S. Pat. No. 3,6622,094 (Wetmore et al) discloses a heat-recoverable article that is arranged to provide, on recovery, an L-shaped insulating cover for a flag-type electrical terminal assembly. The flag terminal, extending perpendicularly to the side of the conductor to which it is attached, is inserted axially as a close fit into a tubular portion of the article, thus requiring precise location with respect thereto.

It is an object of the present invention to provide a recoverable article that is arranged to receive an elongate substrate in a manner having a less stringent requirement than required of the above-mentioned connectors for accurate positioning therein, whilst at the same time allowing for proper enclosing of the substrate. As a consequence, it is a further object of the invention to provide a recoverable article whereby an elongate substrate can quickly and conveniently be received manually and subsequently enclosed.

In accordance with one aspect of the present invention, there is provided a recoverable article having in its recovered state an axis along which, in operation, is disposed an elongate substrate, and having in its recoverable state an opening that is arranged to receive, in operation, the elongate substrate translationally from a direction generally perpendicular to said axis, the article being arranged to have a component of its recovery movement towards the substrate in the direction generally perpendicularly of said axis, thereby, in operation, to enclose the substrate.

An article in accordance with the invention thus allows an elongate substrate, for example, an electrical conductor, to be inserted therein by a translational movement, that is to say by a movement in a plane that includes, or is substantially parallel to a plane that includes, said axis, thus avoiding the necessity of accurate axial alignment of the substrate with an aperture that lies in a plane that extends substantially perpendicular to said axis. On recovery the article and substrate extend generally co-linearly.

The article may comprise at least one further opening that is similar to said opening. Furthermore, the article may comprise a plurality of pairs of said openings in side-by-side relationship, each pair of openings being arranged substantially axially to receive respective ones of substrates, for example electrical conductors, that are to be connected together.

The article may be of generally tubular configuration, which is to be understood to include L, Y, and V shapes as well as generally cylindrically shapes, and at least part of the tubular configuration, before recovery, may include the said axis. Preferably the article has a substantially closed cross-section.

Conveniently, substantially the whole of the article comprises recoverable material, preferably heat-recoverable material, and most preferably heat-recoverable polymeric material. Where the article is used as an electrical connector, it advantageously includes electrically conductive means, which may comprise solder, including any necessary flux, for enhancing electrical connection. Said means may alternatively, or additionally, comprise a metallic strip, preferably having solder mounted thereon.

The article of the present invention may be manufactured as the article described in above-mentioned UK Patent Specification No. 1,062,043 (the disclosure of which is herein incorporated by this reference), which method is particularly advantageous for manufacturing single articles, particularly those of generally tubular configuration and having solder inserted therein. Alternatively, and particularly when a plurality of adjacent, or particularly contiguous, articles are required, manufacture may advantageously be made in accordance with UK Patent Publication Nos. 2,082,110A, 2,083,859A, 2,084,505A, 2,083,403A, or U.S. patent application Ser. No. 172,897, the disclosures of which are herein incorporated by this reference.

Embodiments of recoverable articles in accordance with the present invention will now be described, by way of example, with reference to the accompanying drawings, in which:

FIG. 1 is an end view of one article formed as an electrical connector;

FIG. 2 is a vertical section along the line II—II of FIG. 1, showing, in outline, two electrical conductors in place;

FIG. 3 is a perspective view of an intermediate stage in the manufacture of another embodiment of article formed as a connector; and FIG. 4 shows the article of FIG. 3 completed.

Referring to FIGS. 1 and 2, a heat-recoverable connector 2 is formed from heat-recoverable polymeric material. The connector 2 was initially formed as a substantially cylindrical tubular article open at each end, the two ends of which were subsequently deformed away from its axis to provide two portions 4, 6 extending upwardly, for example generally perpendicularly, thereto. As can be seen particularly from FIG. 2, the deformed end portions 4, 6 are spaced inwardly of respective ends of the connector 2 so as to provide openings 8, 10 that extend not only axially of the connector 2 but also perpendicularly upwardly therefrom. A generally rectangular-sectioned copper strip 12 is located at the bottom of the connector 2 extending into both openings 8, 10, and a ring of solder 14 is retained in the central, closed cross-section, portion 16 of the connector 2.

The connector 2 is particularly suited for joining together two elongate conductors 18. As can been seen from FIG. 2, the upwardly-directed openings 8, 10 allow the conductors 18 to be inserted into respective ends of the connector 2 from a generally downward direction indicated by arrows A, into the positions shown, without the necessity of precise axial alignment, and in particular without the necessity of precise axial introduction of the conductors into the tubular central connector portion 16. The insertion of the conductors 18 may conveniently be carried out by a translational motion in a substantially vertical plane. After the conductors 18 have been introduced into the connector 2 to the position shown in FIG. 2, it is, of course, possible for them subsequently to be slid axially towards each other so as to dispose their stripped end portions within the solder ring 14. However, whether or not such axial movement is subsequently effected, it will be appreciated that since the copper strip 12 extends to the ends of the connector 2, or at least partially into the openings 8, 10, this is overlapped by the stripped ends of the conductors 18 simply by introducing the conductors vertically into the connector 2.

After the conductors 18 have been so inserted in the connector 2, heat is applied to the connector which results in its end portions 4, 6 recovering axially outwardly and downwardly, as indicated by the arrows B so as to close the openings 8 and 10 and enclose the conductors 18 within the connector 2. Thus, it is seen that the ends of the connector recover towards the conductors 18, and that the recovery movement has a component that is directed perpendicularly of the axes of the conductors and of the axis of the connector itself. Continued application of heat is effective to melt the solder ring 14 so as to cause this to flow and provide electrical interconnection between the stripped ends of the conductors, either directly or by means of the copper strips 12.

Thus, after recovery, the axis of the connector 2 lies substantially along the axis of the two conductors 18, which have been brought into such position by movement in a direction, indicated by the arrows A generally perpendicular to said axis.

The connectors 2 may be supplied individually, or, where appropriate, may be attached individually to a backing strip, for example, by adhesive, and supplied in an elongate strip, as in a bandolier.

When the connector described with reference to FIGS. 1 and 2 is supplied in a bandolier arrangement, it will be appreciated that it is particularly suitable for interconnecting a plurality of conductors simultaneously. An alternative connector will now be described with reference to FIGS. 3 and 4, that is also particularly applicable for simultaneously effecting a plurality of interconnections.

The connector 19 of FIGS. 3 and 4 comprises a sheet 20 of cross-linked polymeric material that is secured, for example, by weld lines 22 to another sheet 24 of cross-linked polymeric material of castellated configuration, so as to provide a plurality of generally cylindrical enclosures 26 therebetween in side-by-side relationship. Preferably, but not necessarily, the sheet 24 is recoverable so as to reduce the transverse size of the enclosures 26. To provide a connector embodying the present invention, the sheet 20 thereof is deformed from the planar configuration shown in FIG. 3, to that shown in FIG. 4, whereby the portions at each end of the enclosures 26 are stretched upwardly and pulled axially inwardly so as to provide openings 28 that are directed substantially perpendicularly with respect to the axes of the tubular enclosures 26. The enclosures 26 are provided either by the stage of manufacture shown in FIG. 3, or in its ultimate formation as shown in FIG. 4, with conductive strips 30 and portions of solder (not shown) as described with reference to the embodiment of FIGS. 1 and 2. The connector of FIGS. 3 and 4 has the advantages and method of use as described above with reference to FIGS. 1 and 2. It will be appreciated that by suitable choice of size of sheets 20 and 24 the connector produced may arrange for interconnecting any required number of pairs and gauges of conductors. Furthermore, the connector of FIGS. 3 and 4 may be cut along the weld lines 22 to provide a plurality of separate connectors for interconnecting individual pairs of conductors.

It is also envisaged that the connector 2 or 19 may have the enclosures thereof sealed along the lines C—C and D—D for FIGS. 2 and 4 respectively and be cut in two so as conveniently to provide a connector for forming a butt joint between conductors inserted through the same opening generally from the same direction.

If it is desired to provide more positive retention of the articles in the configurations shown in FIGS. 2 and 4, for example, the folded back portions thereof may be secured together temporarily. This may be done by a welded joint that is arranged to be broken on treating the article to effect recovery thereof.

I claim:

1. A recoverable article comprising an enclosure having two openings facing away from each other for receiving elongate substrates;
    said enclosure having a recoverable state and a recovered state and in its recovered state, an axis along which the elongate substrates are disposed;
    said enclosure in its recoverable state having the openings arranged so as to be capable of receiving the substrates translationally from a direction generally perpendicular to said axis;
    said enclosure having a component of its recovery movement from said recoverable state to said recovered state towards the substrates and generally perpendicular to said axis;
    said enclosure in its recovered state encloses the substrates and aligns the substrates with each other and with said axis.

2. An article according to claim 1, further comprising electrically conductive means disposed therewithin, said means being at least partially exposed by said openings when said article is in said recoverable state so as to allow electrical connection to be made between the elongate substrates on recovery of said article.

3. An article according to claim 2, wherein said electrically conductive means comprises solder.

4. An article according to claim 2, wherein said electrically conductive means comprises a metallic strip extending generally axially of the article.

5. An article according to claim 1, further comprising a metallic strip extending generally axially of the article and at least partially exposed by said openings when said article is in said recoverable state, and solder, said solder being mounted on said metallic strip and being so arranged as, in operation, to effect electrical connection between said strip and the substrates on recovery of said article.

6. An article according to claim 1, formed from recoverable material.

7. An article according to claim 6 formed from polymeric material.

8. An article according to claim 1, wherein the article is recoverable by heat.

9. An article according to claim 1, wherein recovery thereof is arranged to effect electrical connection of the substrates, being electrically conductive, to the article.

10. A recoverable article according to claim 1, further comprising at least one further opening that is similar to said openings, for receipt of a further elongate substrate.

11. An article according to claim 1, further comprising at least two further openings, said openings being arranged in side-by-side relationship with said two openings for receipt of respective ones of the elongate substrates.

12. An article according to claim 1, of generally tubular configuration.

* * * * *